United States Patent
Zhang et al.

(10) Patent No.: US 8,750,515 B2
(45) Date of Patent: Jun. 10, 2014

(54) METHOD AND SYSTEM FOR GENERATING AN IDENTIFIER OF A KEY

(75) Inventors: Xuwu Zhang, Shenzhen (CN); Qing Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 578 days.

(21) Appl. No.: 12/997,253

(22) PCT Filed: Jun. 15, 2009

(86) PCT No.: PCT/CN2009/072279
§ 371 (c)(1),
(2), (4) Date: Jan. 29, 2011

(87) PCT Pub. No.: WO2009/152755
PCT Pub. Date: Dec. 23, 2009

(65) Prior Publication Data
US 2011/0123029 A1      May 26, 2011

(30) Foreign Application Priority Data
Jun. 16, 2008   (CN) .......................... 2008 1 0100473

(51) Int. Cl.
*H04W 12/04* (2009.01)
*H04W 36/00* (2009.01)
*H04L 29/06* (2006.01)

(52) U.S. Cl.
CPC .......... *H04W 12/04* (2013.01); *H04W 36/0038* (2013.01); *H04L 63/08* (2013.01); *H04L 2463/041* (2013.01); *H04L 2209/80* (2013.01)
USPC ............................. 380/272; 455/436; 380/270

(58) Field of Classification Search
USPC ....................................................... 380/272
See application file for complete search history.

(56) References Cited

U.S. PATENT DOCUMENTS

| 7,079,499 B1 | 7/2006 | Akhtar et al. |
| 2005/0282548 A1 | 12/2005 | Kim et al. |

(Continued)

FOREIGN PATENT DOCUMENTS

| CN | 1756427 A | 4/2006 |
| CN | 1889426 A | 1/2007 |

(Continued)

OTHER PUBLICATIONS

3GPP TS 33.401 v2.0.0, May 2008.*

(Continued)

*Primary Examiner* — Andrew Goldberg
(74) *Attorney, Agent, or Firm* — Oppedahl Patent Law Firm LLC (57) ABSTRACT

A method for generating an identifier of a key, comprises that: when a user equipment (UE) transfers from an evolved UMTS terrestrial radio access network (EUTRAN) to a universal terrestrial radio access network (UTRAN) or a global system for mobile communications (GSM), or an enhanced data rate for GSM evolved radio access network (GERAN), an identifier of a system key after transfer is generated by mapping an identifier $KSI_{ASME}$ for an access security management entity, and a mobile management entity generates an identifier of a ciphering key (CK) and an integrity key (IK) by mapping the $KSI_{ASME}$, and then sends the generated identifier to a serving GPRS support node (SGSN), when the UE transfers from the EUTRAN to the UTRAN, the SGSN stores the ciphering key, the integrity key and the identifier thereof, and when the UE transfers from the EUTRAN to the GERAN, the SGSN assigns the value of the identifier of the ciphering key and the integrity key to an identifier of a ciphering key of the GERAN.

8 Claims, 8 Drawing Sheets

(56) References Cited

U.S. PATENT DOCUMENTS

| | | |
|---|---|---|
| 2007/0060127 A1 | 3/2007 | Forsberg |
| 2007/0171871 A1 | 7/2007 | Forsberg |
| 2009/0016300 A1* | 1/2009 | Ahmavaara et al. .......... 370/331 |
| 2009/0258631 A1* | 10/2009 | Forsberg et al. ............. 455/411 |
| 2009/0270099 A1* | 10/2009 | Gallagher et al. ......... 455/435.1 |
| 2009/0271623 A1* | 10/2009 | Forsberg et al. .............. 713/168 |
| 2010/0056156 A1* | 3/2010 | Xu et al. ....................... 455/436 |

FOREIGN PATENT DOCUMENTS

| | | | |
|---|---|---|---|
| CN | 1941695 | A | 4/2007 |
| CN | 101083839 | A | 12/2007 |
| CN | 101102600 | A | 1/2008 |
| CN | 101145932 | A | 3/2008 |
| CN | 101277513 | A | 10/2008 |
| CN | 101299666 | A | 11/2008 |
| CN | 101299884 | A | 11/2008 |
| EP | 1871134 | A1 | 12/2007 |
| WO | 2007025487 | A1 | 3/2007 |
| WO | 2007077483 | A2 | 7/2007 |

OTHER PUBLICATIONS

Notification of the First Office Action of Chinese application No. 200810100473.3, issued on Apr. 25, 2011.

International Search Report on international application No. PCT/CN2009/072279, mailed on Jun. 15, 2009.

English Translation of the Written Opinion of the International Search Authority in international application No. PCT/CN2009/072279, mailed on Jun. 15, 2009.

Notification of the First Office Action of Chinese application No. 200810100472.9 (CN counterpart to U.S. Appl. No. 12/299,630) issued on May 25, 2011 (12 total pages).

International Search Report for international application No. PCT/CN2008/002116 (PCT counterpart to U.S. Appl. No. 12/996,630) mailed Mar. 26, 2009 (7 total pages).

English Translation of the Written Opinion for international application No. PCT/CN2008/002116 (PCT counterpart to U.S. Appl. No. 12/996,630) mailed Mar. 26, 2009 (5 total pages).

* cited by examiner

METHOD AND SYSTEM FOR GENERATING AN IDENTIFIER OF A KEY

TECHNICAL FIELD

The present invention relates to the field of mobile communications, and in particular to a method and system for generating an identifier of a key when a user equipment (UE) transfers from an evolved UMTS terrestrial radio access network (EUTRAN) to a universal terrestrial radio access network (UTRAN) or a global system for mobile communications (GSM) or an enhanced data rate for GSM evolution (EDGE) radio access network (GERAN, GSM/EDGE radio access network).

BACKGROUND

A 3rd generation partnership project (3GPP) evolved packet system (EPS) comprises an EUTRAN and an EPS core network (EPC, evolved packet core).

The EPC comprises a mobility management entity (MME). The MME takes charge of operations related to a control plane, such as mobility management, signaling processing of a non-access stratum (NAS), and management of a user security mode. The MME stores a root key of the EUTRAN, that is, a key of an access security management entity ($K_{ASME}$), and uses the $K_{ASME}$ and an uplink non-access stratum sequence number (NAS SQN) to generate a root key of an access stratum which is used by an evolved Node B (eNB), that is, an eNB key ($K_{eNB}$). A key set identifier for access security management entity ($KSI_{ASME}$) or a key set identifier for an SGSN ($KSI_{SGSN}$) is an identifier of the key $K_{ASME}$ (or called the key sequence number), which is used for performing identification and retrieval of a key between a UE and a network side and has a length of 3 bits. If the $K_{ASME}$ is directly generated through an authentication and key association (AKA) of the EPS, the $KSI_{ASME}$ is used as the identifier of the $K_{ASME}$; and if the $K_{ASME}$ is generated by mapping a key of the UMTS or the GERAN, the $KSI_{SGSN}$ is used as the identifier of the $K_{ASME}$.

When a connection is established between a UE and a network side, the UE or the network side may inform the other party through the $KSI_{ASME}$ that the other party may use a designated key that is previously stored, so as to establish a security context, thereby avoiding performing the authentication and key association (AKA) for each connection and saving network resources. When a key needs to be deleted due to the expiration of the lifetime or other reasons, the UE sets the $KSI_{ASME}$ to be '111'.

In the EUTRAN, the base station device is an eNB, which mainly takes charge of wireless communication, wireless communication management and mobility context management.

In a 3GPP universal mobile telecommunication system (UMTS), the device in charge of the management of packet domain mobility context and/or management of a user security mode is a serving GPRS support node (SGSN). The SGSN further takes charge of the authentication and security management of the UTRAN of the UMTS and stores a key set including an integrity key (IK) and a ciphering key (CK). The identifier of the key set is a key set identifier (KSI), the function and the usage of the KSI are similar to that of the $KSI_{ASME}$ in the EPS, both are used for performing identification and retrieval of a key between the UE and the network side, besides the KSI also has a length of 3 bits. When the KSI is equal to '111', it means that no keys can be used and the KSI is invalid. When an association is needed between the UE and the SGSN to establish a UMTS secure connection, if the UE has stored a key that can be used, it sends the stored KSI to the SGSN, the SGSN checks whether the KSI stored by itself is the same as that sent by the UE and, if so, the SGSN uses the stored key set to establish a security context through association and sends the KSI back to the UE to confirm the key the SGSN uses. If no keys that can be used are stored in the UE, the UE sets the KSI to be '111' and sends the KSI to the SGSN; after checking that the KSI is '111', the SGSN sends an authentication request message to an HLR/HSS, then the UE and the network side re-performs an AKA to generate a new key set.

In a GSM/EDGE system, the device in charge of management of the packet domain mobility context and/or management of a user security mode is also an SGSN, the SGSN takes charge of the authentication and security management of a GSM/EDGE radio access network (GERAN), and stores a ciphering key (Kc) of the GERAN; and the identifier of the Kc is a ciphering key sequence number (CKSN), the function and usage of the CKSN are identical to that of the KSI.

When the UE transfers from the EUTRAN to the UTRAN, the MME generates an IK and a CK for a target network using the $K_{ASME}$ and sends the generated IK and CK to the SGSN, the UE and the SGSN use the IK and the CK to associate a corresponding security algorithm to establish a UTRAN security context. The transfer includes the following two types: a transfer which is performed when a radio resource control (RRC) is in an active state, and a transfer which is performed when the UE is in an idle state. The transfer in an active state includes a handover and so on, and the transfer in an idle state includes a routing area update, an attachment request and so on.

When the UE transfers from the EUTRAN to the GERAN, the MME generates a CK and an IK using the $K_{ASME}$ (with the key generation method that is the same as the method used during the transfer to the UMTS), and then sends the generated IK and CK to the SGSN, and the SGSN uses the IK and the CK to generate the key Kc for the GERAN.

In existing techniques, the $KSI_{ASME}$, the KSI and the CKSN are all generated at the network side during an authentication process and then sent to the UE via an authentication request. However, although the MME generates the IK and the CK which are needed by the UTRAN or GERAN for the target network during the transfer from the EUTRAN to the UTRAN or the GERAN, no corresponding identifiers are provided for this pair of keys. Once the transfer is completed, the UE and the SGSN can neither retrieve the generated key during the transfer nor reuse this pair of keys. When the UE and the network side reestablish an RRC or other connections, as the stored keys cannot be used, the UE and the network side have no choice but to perform an AKA first so as to regenerate new keys and then establish a wireless connection. This will undoubtedly increase the signaling overheads of the UE and the network side and delay the time for the normal communication between the UE and the network side, and as a result, the satisfaction level of the user is reduced.

SUMMARY

The present invention aims to provide a method and system for generating an identifier of a key when a UE transfers between different access systems, which solve the problem in existing techniques that a generated key which a $K_{ASME}$ is mapped into during the transferring process cannot be reused for not being provided with an identifier after a UE transfers from an EUTRAN to a UTRAN or GERAN.

In order to solve the above technical problem, the present invention provides a method for generating an identifier of a key, which comprises that: when a user equipment (UE) transfers from an evolved UMTS terrestrial radio access network (EUTRAN) to a universal terrestrial radio access network (UTRAN), a mobility management entity (MME) and the UE generate a key set identifier of a UTRAN system by mapping a key set identifier for an access security management entity; and the MME sends a serving GPRS support node (SGSN) the key set identifier of the UTRAN system, along with a ciphering key and an integrity key of the system.

Further, the generation mode of the mapping may be as follows: the UE and the MME may directly assign the value of the key set identifier of the UTRAN system to be that of the key set identifier of the access security management entity key, or to be the sum of the value of the key set identifier of the access security management entity key and a constant which is appointed by the UE and a network side.

Further, when the UE transfers from the EUTRAN to the UTRAN in an idle state, after receiving a user information extraction request message sent by the SGSN, the MME may generate an integrity key and a ciphering key using the key of the access security management entity, generate an identifier of the integrity key and the ciphering key, that is, a key set identifier, by mapping the key set identifier of the access security management entity key, and send the integrity key, the ciphering key and the key set identifier to the SGSN via a user information extraction response message; and the SGSN may store the ciphering key, the integrity key and the key set identifier.

Preferably, the request message sent by the UE to the SGSN for transferring to the UTRAN in an idle state may be a routing area update request message; correspondingly, the user information extraction request message may be a context request message, and the user information extraction response message may be a context response.

Preferably, the request message sent by the UE to the SGSN for transferring to the UTRAN in an idle state may be an attachment request message; correspondingly, the user information extraction request message may be an identification request message, and the user information extraction response message may be an identification response.

Further, after determining to transfer to the UTRAN in an idle state and before correspondingly sending the SGSN a message indicative of the completion of the transfer to the UTRAN in an idle state, the UE may generate a key set identifier by mapping the key set identifier of the access security management entity key, and store the key set identifier, along with the integrity key and the ciphering key which are generated from the key of the access security management entity.

Preferably, the message sent by the UE to the SGSN for indicating the completion of the transfer to the UTRAN in an idle state may be a routing area update completion message or an attachment completion message.

Further, when the UE transfers from the EUTRAN to the UTRAN under the condition that a radio source control (RRC) is in an active state, after receiving a handover request, the MME may generate an integrity key and a ciphering key using the key of the access security management entity, generate an identifier of the integrity key and the ciphering key, that is, a key set identifier, by mapping the key set identifier of the access security management entity key, and send the integrity key, the ciphering key and the key set identifier to the SGSN via a forward redirecting request message; the SGSN may store the ciphering key, the integrity key and the key set identifier; and after receiving a handover command sent by the network side, the UE may generate a key set identifier by mapping the key set identifier of the access security management entity key and store the key set identifier, along with the integrity key and the ciphering key which are generated from the key of the access security management entity.

Further, if a key is associated by the network side and the UE before the UE transfers, and if the identifier of the key associated before the transfer is the same as that of the system key which is generated by mapping the key set identifier of the access security management entity key during the transferring process, then the key stored in the SGSN and the UE before the transfer may be deleted.

The present invention also provides a method for generating an identifier of a key, which comprises that: when a UE transfers from an EUTRAN to a global system for mobile communications (GSM) or an enhanced data rate for GSM evolution radio access network (GERAN), an MME generates an identifier of a ciphering key and an integrity key by mapping a key set identifier for an access security management entity, and sends the ciphering key, the integrity key and the identifier thereof to an SGSN;

the SGSN assigns the value of the identifier of the ciphering key and the integrity key to an identifier of a ciphering key of the GSM or GERAN, that is, the sequence number of the ciphering key; and the UE generates the identifier of the ciphering key of the GSM or GERAN by mapping the key set identifier of the access security management entity key.

Further, the generation mode of the mapping may be as follows: the MME may directly assign the value of the identifier of the ciphering key and the integrity key to be that of the key set identifier of the access security management entity key, or to be the sum of the value of the key set identifier of the access security management entity key and a constant which is appointed by the UE and a network side; and the UE may directly assign the value of the identifier of the ciphering key of the GSM or GERAN to be that of the key set identifier of the access security management entity key, or to be the sum of the value of the key set identifier of the access security management entity key and a constant which is appointed by the UE and the network side.

Further, when the UE transfers from the EUTRAN to the GSM or GERAN in an idle state, after receiving a user information extraction request message, the MME may generate an integrity key, a ciphering key and an identifier thereof, and send the integrity key, the ciphering key and the identifier thereof to the SGSN via a user information extraction response message.

Preferably, the request message sent by the UE to the SGSN for transferring to the GSM or GERAN in an idle state may be a routing area update request message; correspondingly, the user information extraction request message may be a context request message, and the user information extraction response message may be a context response.

Preferably, the request message sent by the UE to the SGSN for transferring to the GSM or GERAN in an idle state may be an attachment request message; correspondingly, the user information extraction request message may be an identification request message, and the user information extraction response message may be an identification response.

Further, after determining to transfer to the GSM or GERAN in an idle state and before correspondingly sending the SGSN a message indicative of the completion of the transfer to the GSM or GERAN in an idle state, the UE may generate an identifier of a ciphering key of the GSM or GERAN by mapping the key set identifier of the access security management entity key, and store the identifier of the ciphering key of the GSM or GERAN, along with the ciphering key of the GSM or GERAN which is generated from the key of the access security management entity.

Preferably, the message sent by the UE to the SGSN for indicating the completion of the transfer to the GSM or GERAN in an idle state may be a routing area update completion message or an attachment completion message.

Further, when the UE transfers from the EUTRAN to a UTRAN under the condition that a radio resource control (RRC) is in an active state, after receiving a handover request, the MME may generate a ciphering key, an integrity key and an identifier thereof, and send the integrity key, the ciphering key and the identifier thereof to the SGSN via a forward redirecting request message; and after receiving a handover command sent by the network side, the UE may generate a ciphering key of the GSM or GERAN and an identifier thereof.

Further, if a key is associated by the network side and the UE before the UE transfers, and if the identifier of the key associated before the transfer is the same as that of the ciphering key of the GSM or GERAN which is generated through mapping during the transferring process, then the key stored in the SGSN and the UE before the transfer may be deleted.

The present invention provides a system for generating an identifier of a key, which comprises a UE, a mobility management entity (MME) and a serving GPRS support node (SGSN), wherein the UE is used for mapping a key set identifier for an access security management entity into a key set identifier of a UTRAN system when the UE transfers from an EUTRAN to a UTRAN;

the MME is used for mapping a key set identifier of the access security management entity key into a key set identifier of the UTRAN system when the UE transfers from the EUTRAN to the UTRAN and sending the obtained identifier to the SGSN;

the mapping mode is as follows: the UE and the MME directly assign the value of the key set identifier of the UTRAN system key set to be that of the key set identifier of the access security management entity key, or to be the sum of the value of the key set identifier of the access security management entity key and a constant which is appointed by the UE and a network side;

Further, the UE may comprise:

a first key set identifier mapping unit, for generating an identifier of an integrity key and a ciphering key through mapping, and mapping the value of an identifier of a key of a root key access security management entity of the EUTRAN, or the value of the identifier of the key of the root key access security management entity of the EUTRAN plus an appointed constant, to the identifier of the integrity key and the ciphering key;

a first key and identifier thereof storing unit, for storing the ciphering key, the integrity key and the identifier of the ciphering key and the integrity key that is generated by the first key set identifier mapping unit;

the MME may comprise:

a second key set identifier mapping unit, for generating an identifier of an integrity key and a ciphering key, and mapping the value of an identifier of a key of a root key access security management entity of the EUTRAN, or the value of the identifier of the key of the root key access security management entity of the EUTRAN plus an appointed constant, to the identifier of the integrity key and the ciphering key;

a security parameter sending unit, for sending the SGSN the ciphering key, the integrity key, and the identifier of the ciphering key and the integrity key which is generated by the second key set identifier mapping unit;

the SGSN may comprise:

a security parameter receiving unit, for receiving the ciphering key, the integrity key and the identifier thereof which are sent by the MME;

a third key and identifier thereof storing unit, which is used for storing the received ciphering key and integrity key and the identifier thereof.

The present invention also provides a system for generating an identifier of a key, which comprises a UE, a mobility management entity (MME) and a serving GPRS support node (SGSN), wherein the UE is used for generating an identifier of a ciphering key of a GSM or GERAN by mapping a key set identifier for an access security management entity when transferring from an EUTRAN to the GSM or GERAN;

the MME is used for generating an identifier of a ciphering key and an integrity key by mapping a key set identifier of the access security management entity key when the UE transfers from the EUTRAN to the GSM or GERAN, and sending the ciphering key, the integrity key and the identifier thereof to the SGSN;

the SGSN is used for receiving the ciphering key, the integrity key and the identifier thereof which are sent by the MME, and assigning the value of the identifier of the ciphering key and the integrity key to the identifier of the ciphering key of the GSM or GERAN;

the mapping generation mode is as follows: the MME directly assigns the value of the identifier of the ciphering key and the integrity key to be that of the key set identifier of the access security management entity key, or to be the sum of the value of the key set identifier of the access security management entity key and a constant which is appointed by the UE and a network side, and the UE directly assigns the value of the identifier of the ciphering key of the GSM or GERAN to be that of the key set identifier of the access security management entity key, or to be the sum of the value of the identifier of the key of the access security management entity and a constant which is appointed by the UE and the network side.

Further, the UE may comprise:

a first key set identifier mapping unit, for mapping the value of an identifier of a key is of a root key access security management entity of the EUTRAN, or the value of the identifier of the key of the root key access security management entity of the EUTRAN plus a constant, to the identifier of the ciphering key of the GSM or GERAN;

a first key and identifier thereof storing unit, which is used for storing the ciphering key of the GSM or GERAN and the identifier thereof;

the MME may comprise:

a second key set identifier mapping unit, for generating an identifier of the integrity key and the ciphering key, and mapping the value of the key set identifier of the access security management entity key, or the value of the key set identifier of the access security management entity key plus a constant, to the identifier of the integrity key and the ciphering key;

a security parameter sending unit, for sending the SGSN the ciphering key, the integrity key, and the identifier of the ciphering key and the integrity key that is generated by the second key set identifier mapping unit;

the SGSN may comprise:

a security parameter receiving unit, for receiving the ciphering key, the integrity key and the identifier thereof which are sent by the MME;

a third key set identifier mapping unit, for assigning the value of the ciphering key, the integrity key and the identifier thereof to the identifier of the ciphering key of the GSM or GERAN;

a third key and identifier thereof storing unit, which is used for storing the ciphering key of the GSM or GERAN and the identifier thereof.

By mapping the $KSI_{ASME}$ into the KSI or CKSN, the above method and system for generating a key set identifier, simultaneously guarantee that there are no repeated codes in the value of the KSI/CKSN and the values of previously-stored key set identifiers, and therefore solve the problem in existing techniques that the key obtained through mapping cannot be reused for not being provided with an identifier when the UE transfers from the EUTRAN to the UTRAN/GERAN.

DETAILED DESCRIPTION

In order to reuse the key generated by a $K_{ASME}$ and reduce the signaling interaction between a UE and a network side, it is required to generate an identifier for a key during transferring process. For this reason, the present invention provides a method and system for generating a key set identifier when a UE transfers from an EUTRAN to a UTRAN/GERAN.

The present invention is illustrated below in detail by reference to the accompanying drawings in combination with the embodiments.

Figure 1:
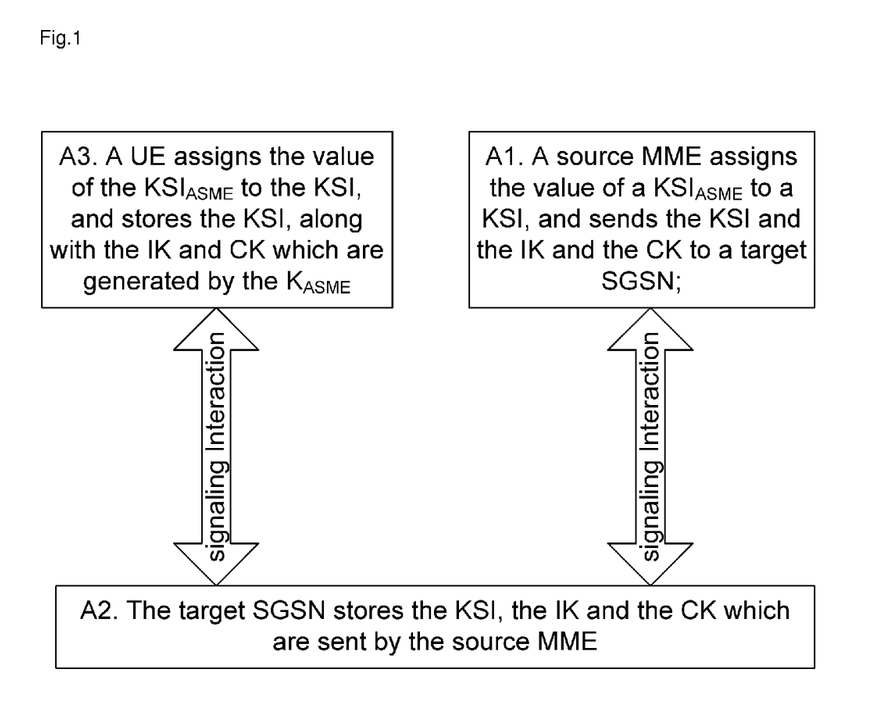
FIG. 1 is a schematic diagram illustrating the specific implementation of a method for generating a key set identifier during the transfer from an EUTRAN to a UTRAN according to the present invention.

FIG. 1 is a schematic diagram illustrating the specific implementation of a method for generating a key set identifier when a UE transfers from an EUTRAN to a UTRAN according to the present invention. The method comprises the following steps:

A1, after receiving a request message, a source MME maps a $KSI_{ASME}$ into a KSI, that is, assigns the value of the $KSI_{ASME}$ to the KSI to make KSI=$KSI_{ASME}$, and then sends a target SGSN the KSI, along with an IK and CK which are generated by the $K_{ASME}$ via an interaction message of the source MME and the target SGSN;

A2, after receiving the KSI, the IK and the CK which are sent by the source MME, the target SGSN stores the KSI, the IK and the CK and sends the UE a message indicative of the completion of KSI mapping;

A3, the UE maps the $KSI_{ASME}$ into the KSI, that is, assigns the value of the $KSI_{ASME}$ to the KSI to make KSI=$KSI_{ASME}$, and stores the KSI, along with the IK and CK which are generated by the $K_{ASME}$.

Herein, the source MME and the UE may also make the value of the KSI equal to the sum of the value of the $KSI_{ASME}$ and a constant. The constant is determined by the UE and a network side together. The sum of the value of the $KSI_{ASME}$ and the constant should not be '111', and if the sum of the value of the $KSI_{ASME}$ and the constant is just '111', the UE and the network side are required to determine the sum of the value of the $KSI_{ASME}$ and the constant to be another value, such as, a next value '000' or other values.

If a key is associated by the UE and the SGSN at the network side before the transfer, and if the value of the KSI associated before the transfer is the same as that of the generated KSI which the $KSI_{ASME}$ is mapped into during the transferring process, then the keys stored in the UE and the target SGSN before the transfer are deleted.

Figure 2:
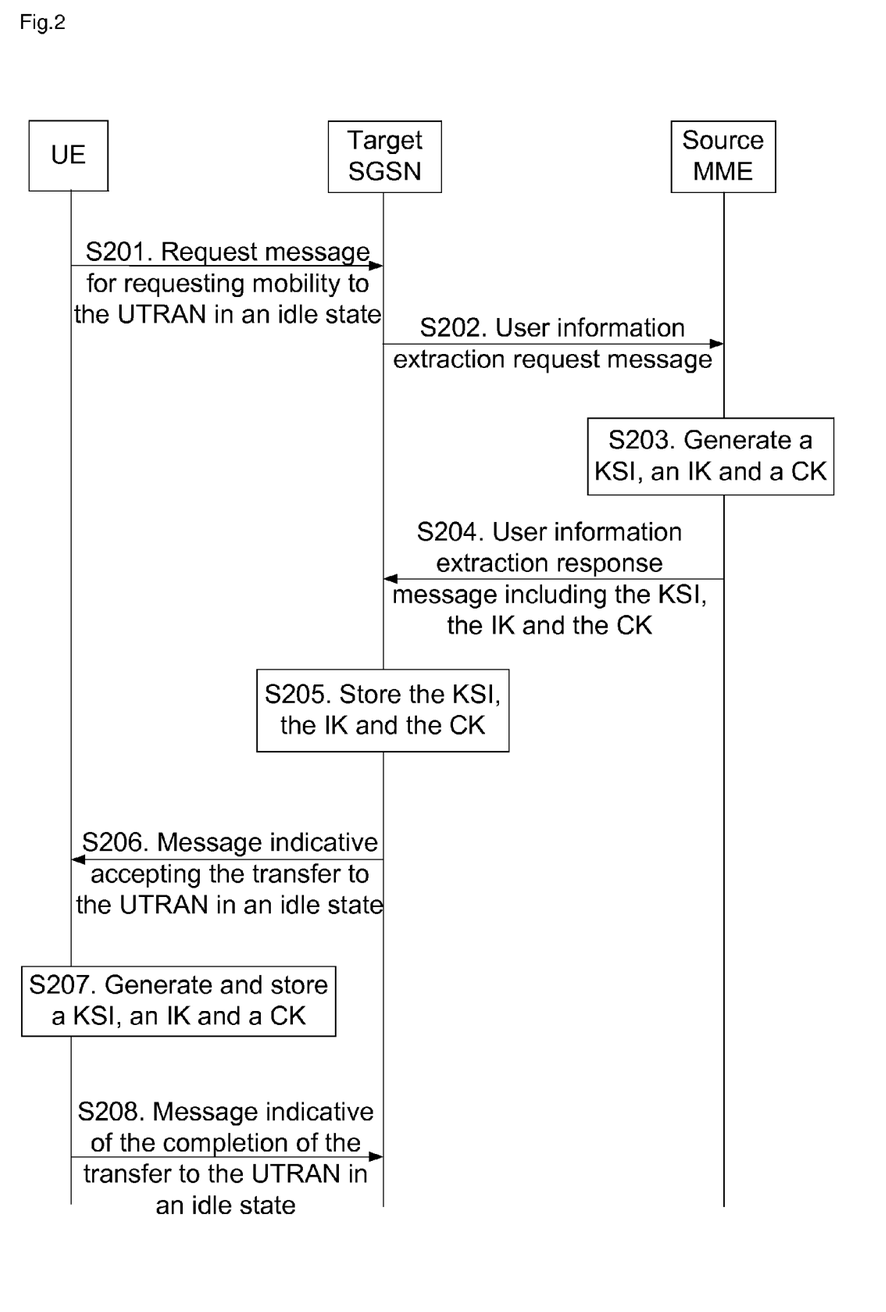
FIG. 2 is a flowchart illustrating the signaling implementation of a first embodiment according to the method of the present invention.

FIG. 2 illustrates a first embodiment of the method according to the present invention, which depicts a flow of the method for generating an identifier of a key when a UE transfers from an EUTRAN to a UTRAN in an idle state. The method comprises the following steps:

S201, the UE determines to transfer to the UTRAN in an idle state and sends a target SGSN a request message for requesting transfer to the UTRAN in an idle state;

herein, the request message for requesting transfer to the UTRAN in an idle state may be a routing area update request or an attachment request;

S202, after receiving the request message sent by the UE for requesting transfer to the UTRAN in an idle state, the target SGSN sends a source MME a user information extraction request message corresponding to the request message for requesting transfer to the UTRAN in an idle state;

herein, the 'corresponding' refers to a type correspondence between the user information extraction request message sent by the target SGSN to the source MME and the request message received by the target SGSN for requesting transfer to the UTRAN in an idle state;

for example, if in step S201 the request message sent by the UE to the target SGSN is a routing area update request, then the user information extraction request message is a context request message in this step;

for another example, if in step S201 the request message sent by the UE to the target SGSN is an attachment request, then the user information extraction request message is an identification request message in this step;

S203, after receiving the user information extraction request message sent by the target SGSN, the source MME assigns the value of the $KSI_{ASME}$ to the KSI, that is, makes KSI=$KSI_{ASME}$, and generates an IK and a CK using the $KSI_{ASME}$;

S204, the source MME sends the target SGSN a user information extraction response message including the KSI, the IK and the CK, wherein:

if in step S203 the source MME receives a context request message from the target SGSN, then the user information extraction response message is a context response message in this step;

if in step S203 the source MME receives an identification request message from the target SGSN, then the user information extraction response message is an identification response message in this step;

S205, after receiving the KSI, the IK and the CK which are sent by the source MME, the target SGSN stores the KSI, the IK and the CK;

S206, the target SGSN sends the UE a message indicative of accepting the transfer to the UTRAN in an idle state, so as to inform the UE of the successful mapping of the identifier of a key of a network side, wherein:

if in step S201 the request message sent by the UE to the target SGSN is a routing area update request, then the message indicative of accepting the transfer to the UTRAN in an idle state is a routing area update accept message in this step;

if in step S201 the request message sent by the UE to the target SGSN is an attachment request, then the message indicative of accepting the transfer to the UTRAN in an idle state is an attachment accept message in this step;

S207, the UE assigns the value of the $KSI_{ASME}$ to the KSI, that is, makes $KSI_{ASME}$=KSI, and stores the KSI, along with the IK and CK which are generated by the $K_{ASME}$; and S208, the UE sends the target SGSN a message indicative of the completion of the transfer to the UTRAN in an idle state, wherein if in step S201 the request message sent by the UE to the target SGSN is a routing area update request, then the message indicative of the completion of the transfer to the UTRAN in an idle state is a routing area update completion message in this step;

if in step S201 the request message sent by the UE to the target SGSN is an attachment request, then the message indicative of the completion of the transfer to the UTRAN in an idle state is an attachment completion message in this step.

Figure 3:
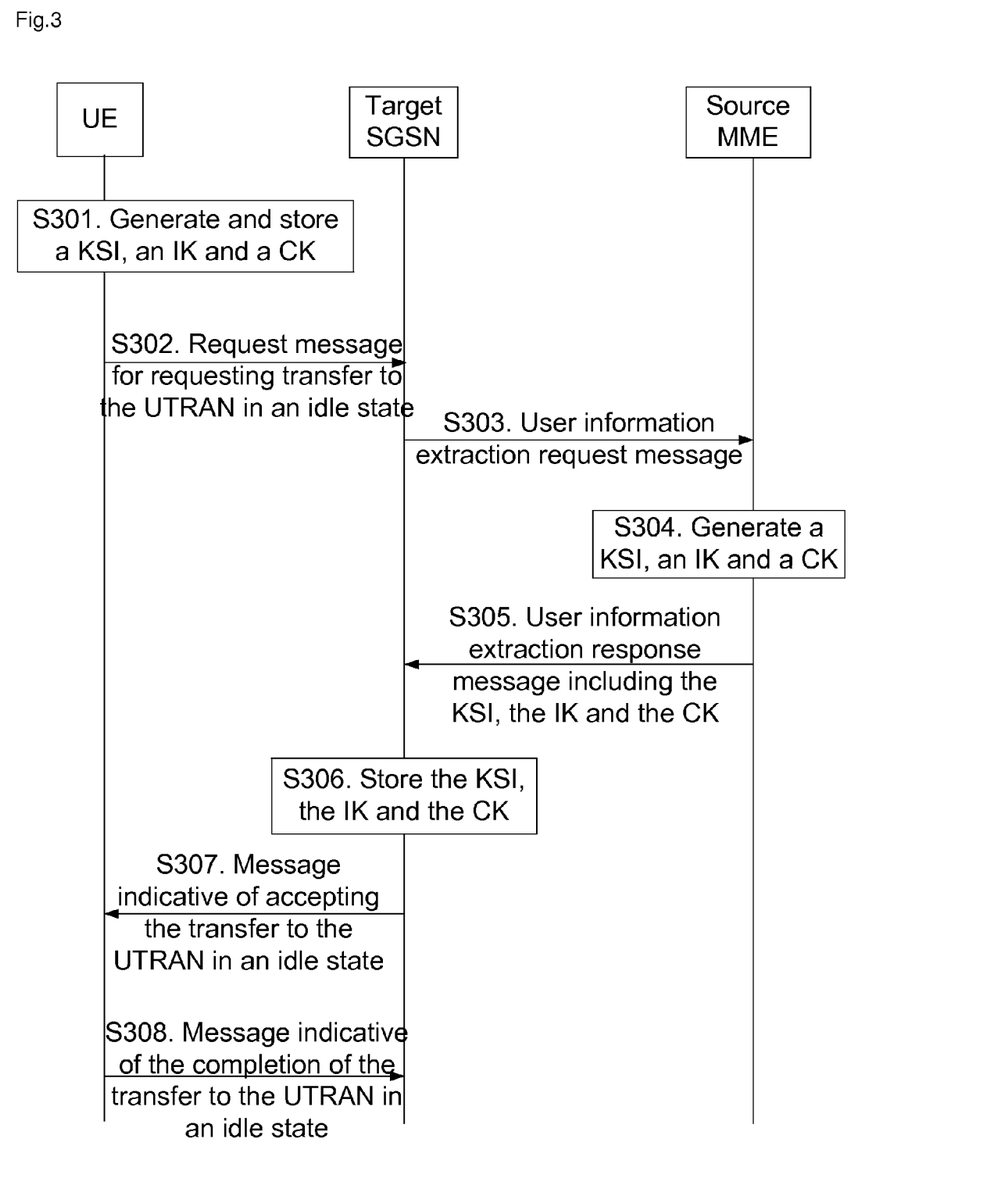
FIG. 3 is a flowchart illustrating the signaling implementation of a second embodiment according to the method of the present invention.

FIG. 3 illustrates a second embodiment of the method according to the present invention, which depicts a flow of the method for generating an identifier of a key when a UE transfers from an EUTRAN to a UTRAN in an idle state, the method comprises the following steps:

S301, the UE determines to transfer to the UTRAN in an idle state, assigns the value of a $KSI_{ASME}$ to a KSI, that is, makes KSI=$KSI_{ASME}$, and stores the KSI, along with an IK and CK which are generated by the $K_{ASME}$;

S302, the UE sends a target SGSN a request message for requesting transfer to the UTRAN in an idle state;

herein, the request message for requesting transfer to the UTRAN in an idle state is a routing area update request or an attachment request;

S303, after receiving the request message sent by the UE for requesting transfer to the UTRAN in an idle state, the target SGSN sends a source MME a user information extraction request message corresponding to the request message for requesting transfer to the UTRAN in an idle state, wherein if in step S302 the request message sent by the UE to the target SGSN is a routing area update request, then the user information extraction request message is a context request message in this step;

and if in step S302 the request message sent by the UE to the target SGSN is an attachment request, then the user information extraction request message is an identification request message in this step;

S304, after receiving the user information extraction request message sent by the target SGSN, the source MME assigns the value of the $KSI_{ASME}$ to the KSI, that is, makes KSI=$KSI_{ASME}$, and generates an IK and a CK using the $K_{ASME}$;

S305, the source MME sends the target SGSN a user information extraction response message including the KSI, the IK and the CK, wherein:

if in step S304 the source MME receives a context request message from the target SGSN, then the user information extraction response message is a context response message in this step;

if in step S304 the source MME receives an identification request message from the target SGSN, then the user information extraction response message is an identification response message in this step;

S306, after receiving the KSI, the IK and the CK which are sent by the source MME, the target SGSN stores the KSI along with the IK and the CK;

S307, the target SGSN sends the UE a message indicative of accepting the transfer to the UTRAN in an idle state, so as to inform the UE of the successful mapping of the identifier of a key of a network side, wherein:

if in step 302 the request message sent by the UE to the target SGSN is a routing area update request, then the message indicative of accepting the transfer to the UTRAN in an idle state is a routing area update accept message in this step;

if in step S302 the request message sent by the UE to the target SGSN is an attachment request, then the message indicative of accepting the transfer to the UTRAN in an idle state is an attachment accept message in this step; and S308, the UE sends the target SGSN a message indicative of the completion of the transfer to the UTRAN in an idle state, wherein if in step S302 the request message sent by the UE to the target SGSN is a routing area update request, then the message indicative of the completion of the transfer to the UTRAN in an idle state is a routing area update completion message in this step;

if in step S302 the request message sent by the UE to the target SGSN is an attachment request, then the message indicative of the completion of the transfer to the UTRAN in an idle state is an attachment completion message in this step.

Figure 4:
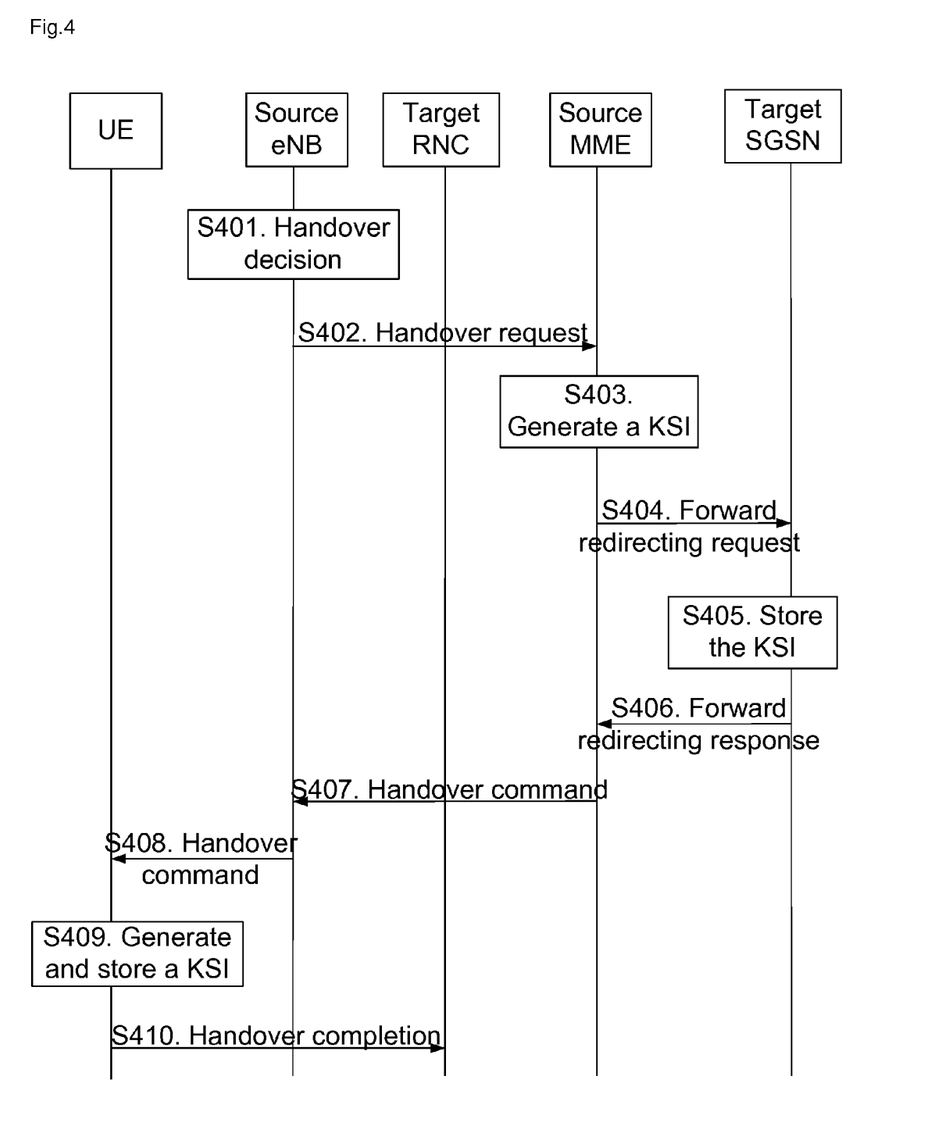
FIG. 4 is a flowchart illustrating the signaling implementation of a third embodiment according to the method of the present invention.

FIG. 4 illustrates a third embodiment of the method according to the present invention, which refers to the transfer when an RRC is in an active state, that is, a flow of the method for generating an identifier of a key during the transfer from an EUTRAN to a UTRAN, the method comprises the following steps:

S401, a source eNB determines to initiate a handover;

herein, the determining of the source eNB on the initiation of a handover may be triggered based on a measurement report sent by a UE to the eNB, or the eNB determines to initiate the transfer based on other reasons;

S402, the source eNB sends a handover request to a source MME;

S403, after receiving the handover request, the source MME assigns the value of a $KSI_{ASME}$ to a KSI, that is, makes KSI=$KSI_{ASME}$, and generates an IK and a CK using the $K_{ASME}$;

S404, the source MME sends a target SGSN a forward redirecting request including the KSI, the IK and the CK;

S405, the target SGSN stores the KSI along with the IK and the CK;

S406, the target SGSN sends the source MME a forward redirecting response message, so as to inform the source MME that the target network is ready for a handover;

S407, the source MME sends a handover command to the source eNB;

S408, the source eNB sends an EUTRAN handover command to the UE;

S409, after receiving the handover command, the UE assigns the value of the $KSI_{ASME}$ to the KSI, that is, makes KSI=$KSI_{ASME}$, generates an IK and a CK using the $K_{ASME}$, and stores the KSI along with the IK and the CK; and S410, the UE sends a handover success message to a target radio network controller (RNC) to inform the RNC of the successful generation of the KSI of a network side.

Figure 5:
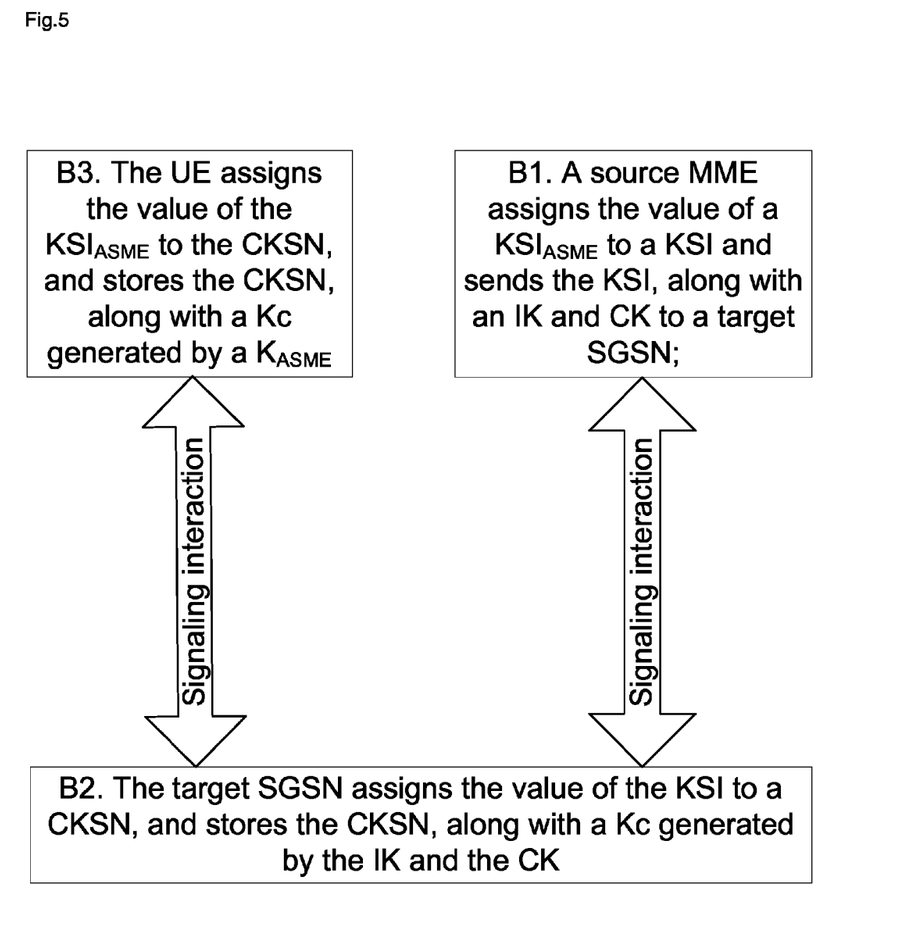
FIG. 5 is a schematic diagram illustrating the specific implementation of a method for generating a key set identifier during the transfer from an EUTRAN to a GERAN according to the present invention.

FIG. 5 is a schematic diagram illustrating the specific implementation of a method for generating a key set identifier during the transfer from an EUTRAN to a GERAN according to the present invention, the method comprises the following steps:

B1, after receiving a relevant request message, a source MME maps a $KSI_{ASME}$ into a KSI, that is, assigns the value of the $KSI_{ASME}$ to the KSI to make KSI=$KSI_{ASME}$, and then sends a target SGSN the KSI, along with an IK and CK which are generated by the $K_{ASME}$ via an interaction message of the source MME and the target SGSN;

B2, after receiving the KSI, the IK and the CK which are sent by the source MME, the target SGSN assigns the value of the KSI to a CKSN, that is, makes CKSN=KSI, stores the CKSN, along with a Kc generated by the IK and the CK, and sends a UE a message indicative of the completion of CKSN mapping;

B3, the UE maps the $KSI_{ASME}$ into the CKSN, that is, assigns the value of the $KSI_{ASME}$ to the CKSN to make CKSN=$KSI_{ASME}$, and stores the CKSN, along with a Kc generated by the $K_{ASME}$.

Herein, the UE may also make the CKSN equal to the sum of the value of the $KSI_{ASME}$ and a constant, the source MME may also make the value of the KSI equal to the sum of the value of the $KSI_{ASME}$ and a constant, wherein the above two constants are determined by the UE and a network side together, and the sum of the value of the $KSI_{ASME}$ and the constant should not be '111', and if the sum of the value of the $KSI_{ASME}$ and the constant is just '111', the UE and the network side are required to determine the sum of the value of the $KSI_{ASME}$ and the constant to be another value, such as, a next value '000' or other values.

In this method, if a key is associated by the UE and the SGSN at the network side before the transfer, and if the value of the identifier CKSN of the key is the same as that of the CKSN which the $KSI_{ASME}$ is mapped into during the transferring process, then the keys stored in the UE and the target SGSN before the transfer are deleted.

Figure 6:
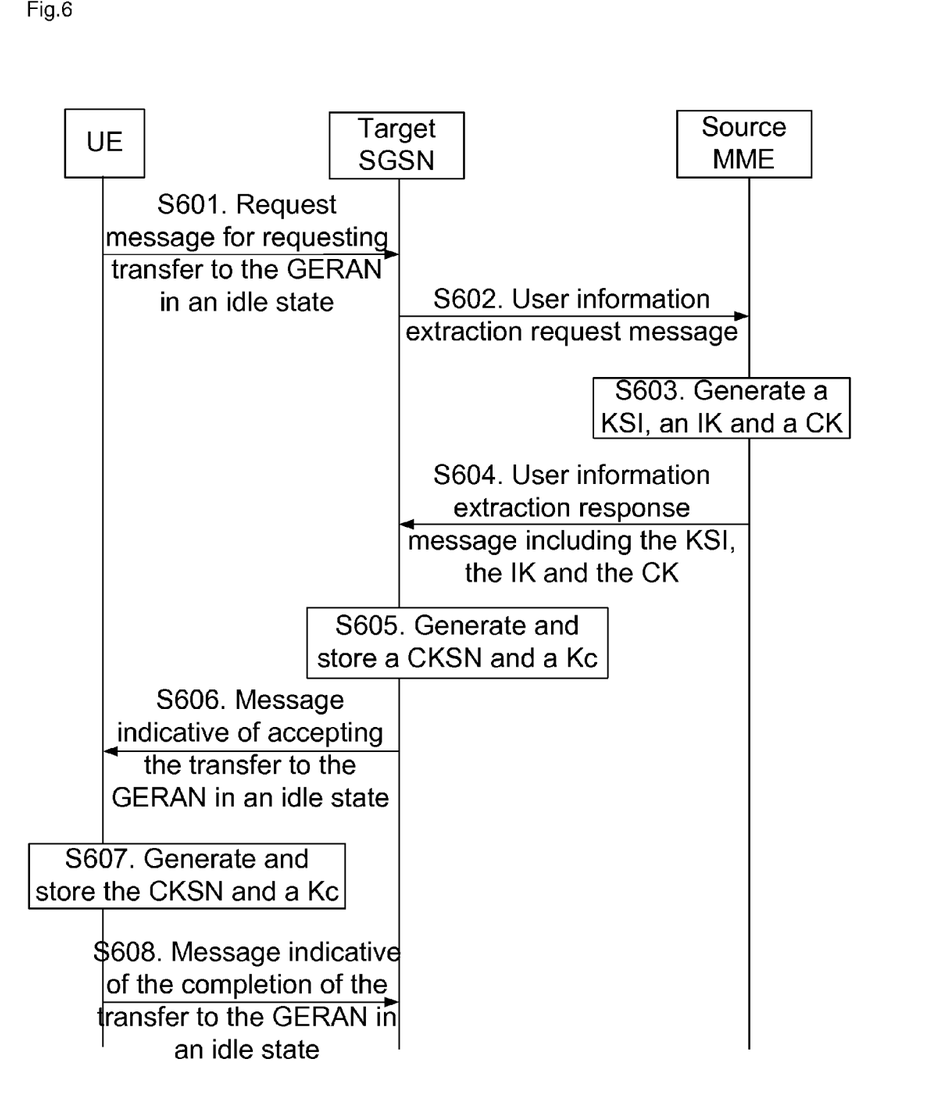
FIG. 6 is a flowchart illustrating the implementation of a fourth embodiment according to the method of the present invention.

FIG. 6 illustrates a fourth embodiment of the method according to the present invention, which depicts a flow of the method for generating an identifier of a key when a UE transfers from an EUTRAN to a GERAN in an idle state, the method comprises the following steps:

S601, the UE determines to transfer to the GERAN in an idle state and sends a target SGSN a request message for requesting transfer to the GERAN in an idle state;

herein, the request message for requesting transfer to the GERAN in an idle state may be a routing area update request or an attachment request;

S602, after receiving the request message sent by the UE for requesting transfer to the GERAN in an idle state, the target SGSN sends a source MME a user information extraction request message corresponding to the request message for requesting transfer to the GERAN in an idle state, wherein:

if in step S601 the request message sent by the UE to the target SGSN is a routing area update request, then the user information extraction request message is a context request message in this step;

if in step S601 the request message sent by the UE to the target SGSN is an attachment request, then the user information extraction request message is an identification request message in this step;

S603, after receiving the user information extraction request message sent by the target SGSN, the source MME assigns the value of the $KSI_{ASME}$ to a KSI, that is, makes KSI=$KSI_{ASME}$, and generates an IK and a CK using a $K_{ASME}$;

S604, the source MME sends the target SGSN a user information extraction response message including the KSI, the IK and the CK, wherein:

if in step S603 the source MME receives a context request message from the target SGSN, then the user information extraction response message is a context response message in this step;

if in step S603 the source MME receives an identification request message from the target SGSN, then the user information extraction response message is an identification response message in this step;

S605, after receiving the KSI, the IK and the CK which are sent by the source MME, the target SGSN assigns the value of the KSI to a CKSN, and stores the CKSN, along with a Kc generated by the IK and the CK;

S606, the target SGSN sends the UE a message indicative of accepting the transfer to the GERAN in an idle state, so as to inform the UE of the successful mapping of the identifier of a key of a network side, wherein:

if in step S601 the request message sent by the UE to the target SGSN is a routing area update request, then the message indicative of accepting the transfer to the GERAN in an idle state is a routing area update accept message in this step;

if in step S601 the request message sent by the UE to the target SGSN is an attachment request, then the message indicative of accepting the transfer to the GERAN in an idle state is an attachment accept message in this step;

S607, the UE assigns the value of the $KSI_{ASME}$ to the CKSN, that is, makes CKSN=$KSI_{ASME}$, and stores the CKSN, along with a Kc generated by the $K_{ASME}$; and S608, the UE sends the target SGSN a message indicative of the completion of the transfer to the GERAN in an idle state, wherein:

if in step S601 the request message sent by the UE to the target SGSN is a routing area update request, then the message indicative of the completion of the transfer to the GERAN in an idle state is a routing area update completion message in this step;

if in step S601 the request message sent by the UE to the target SGSN is an attachment request, then the message indicative of the completion of the transfer to the GERAN in an idle state is an attachment completion message in this step.

Figure 7:
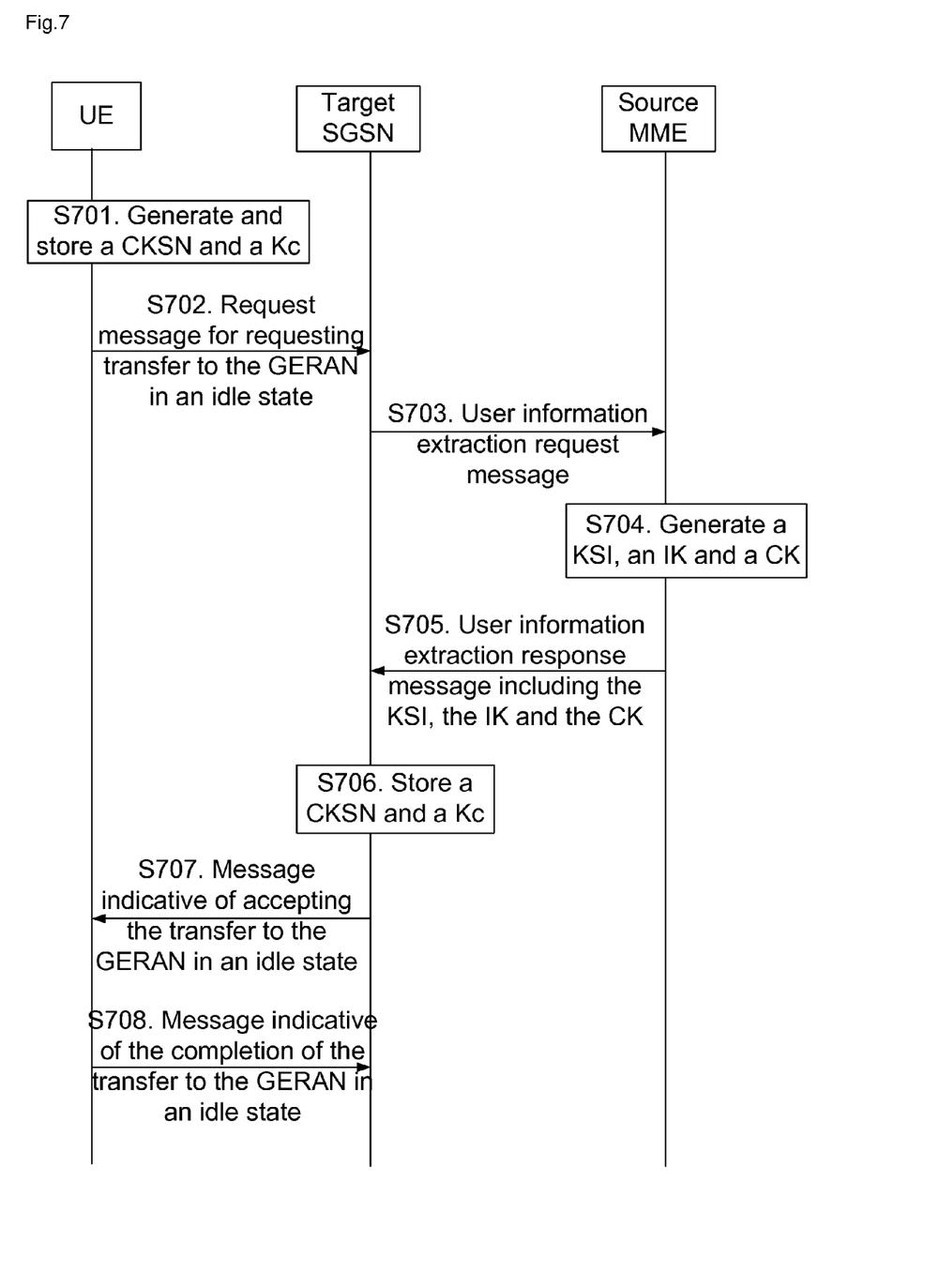
FIG. 7 is a flowchart illustrating the signaling implementation of a fifth embodiment according to the method of the present invention.

FIG. 7 illustrates a fifth embodiment of the method according to the present invention, which depicts a flow of the method for generating an identifier of a key when a UE transfers from an EUTRAN to a GERAN in an idle state, the method comprises the following steps:

S701, the UE determines to transfer to the GERAN in an idle state, assigns the value of a $KSI_{ASME}$ to a CKSN, that is, makes CKSN=$KSI_{ASME}$, and stores the CKSN, along with a Kc generated by the $K_{ASME}$;

S702, the UE sends a target SGSN a request message for requesting transfer to the GERAN in an idle state;

herein, the request message for requesting transfer to the GERAN in an idle state is a routing area update request or an attachment request;

S703, after receiving the request message sent by the UE for requesting transfer to the GERAN in an idle state, the target SGSN sends a source MME a user information extraction request message corresponding to the request message for requesting transfer to the GERAN in an idle state, wherein:

if in step S702 the request message sent by the UE to the target SGSN is a routing area update request, then the user information extraction request message is a context request message in this step;

if in step S702 the request message sent by the UE to the target SGSN is an attachment request, then the user information extraction request message is an identification request message in this step;

S704, after receiving the user information extraction request message sent by the target SGSN, the source MME assigns the value of the $KSI_{ASME}$ to a KSI, that is, makes $KSI=KSI_{ASME}$, and generates an IK and a CK using the $K_{ASME}$;

S705, the source MME sends the target SGSN a user information extraction response message including the KSI, the IK and the CK, wherein:

if in step S704 the source MME receives a context request message from the target SGSN, then the user information extraction response message is a context response message in this step;

if in step S704 the source MME receives an identification request message from the target SGSN, then the user information extraction response message is an identification response message in this step;

S706, after receiving the KSI, the IK and the CK which are sent by the source MME, the target SGSN assigns the value of the KSI to the CKSN, and stores the CKSN, along with a Kc generated by the IK and the CK;

S707, the target SGSN sends the UE a message indicative of accepting the transfer to the GERAN in an idle state, so as to inform the UE of the successful mapping of the identifier of a key of a network side, wherein:

if in step S702 the request message sent by the UE to the target SGSN is a routing area update request, then the message indicative of accepting the transfer to the GERAN in an idle state is a routing area update accept message in this step;

if in step S702 the request message sent by the UE to the target SGSN is an attachment request, then the message indicative of accepting the transfer to the GERAN in an idle state is an attachment accept message in this step; and S708, the UE sends the target SGSN a message indicative of the completion of the transfer to the GERAN in an idle state, wherein:

if in step S702 the request message sent by the UE to the target SGSN is a routing area update request, then the message indicative of the completion of the transfer to the GERAN in an idle state is a routing area update completion message in this step;

if in step S702 the request message sent by the UE to the target SGSN is an attachment request, then the message indicative of the completion of the transfer to the GERAN in an idle state is an attachment completion message in this step.

Figure 8:
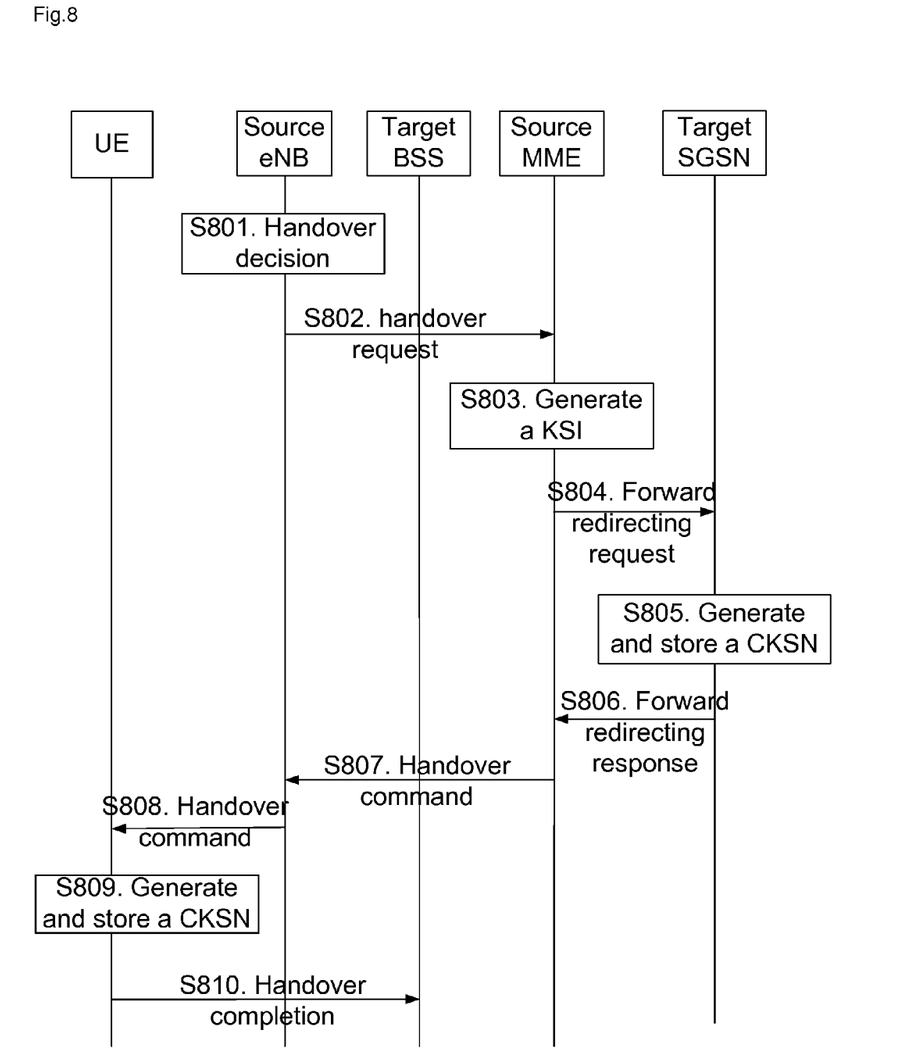
FIG. 8 is a flowchart illustrating the signaling implementation of a sixth embodiment according to the method of the present invention.

FIG. 8 illustrates a sixth embodiment of the method according to the present invention, which depicts a flow of the method for generating an identifier of a key during mobility from an EUTRAN to a GERAN when an RRC is in an active state, the method comprises the following steps:

S801, a source eNB determines to initiate a handover;

herein, the determining of the source eNB on the initiation of a handover may be triggered based on a measurement report sent by a UE to the eNB, or the eNB determines to initiate the transfer based on other reasons;

S802, the source eNB sends a handover request to a source MME;

S803, after receiving the handover request, the source MME assigns the value of a $KSI_{ASME}$ to a KSI, that is, makes $KSI=KSI_{ASME}$, and generates an IK and a CK using the $K_{ASME}$;

S804, the source MME sends a target SGSN a forward redirecting request including the KSI, the IK and the CK;

S805, the target SGSN assigns the value of the KSI to a CKSN, that is, makes CKSN=KSI, and stores the CKSN, along with a Kc generated by the IK and the CK;

S806, the target SGSN sends the source MME a forward redirecting response message, so as to inform the source MME that the target network is ready for a handover;

S807, the source MME sends a handover command to the source eNB;

S808, the source eNB sends an EUTRAN handover command to the UE;

S809, after receiving the handover command, the UE assigns the value of the $KSI_{ASME}$ to the CKSN, that is, makes $CKSN=KSI_{ASME}$, generates a Kc using the $K_{ASME}$, and stores the generated CKSN and Kc; and S810, the UE sends a handover success message to a target RNC or BSS to inform the target RNC or BSS of the successful mapping of the CKSN of a network side.

In the above six embodiments, the source MME and the UE may also make the is value of the identifier of a key of the target system equal to the sum of the value of the $KSI_{ASME}$ and a constant, wherein the constant is determined by the UE and the network side together, and the sum of the value of the $KSI_{ASME}$ and the constant should not be '111', and if the sum of the value of the $KSI_{ASME}$ and the constant is just '111', the UE and the network side are required to determine the sum of the value of the $KSI_{ASME}$ and the constant to be another value, such as, a next value '000' or other values.

The $KSI_{ASME}$ and the $KSI_{SGSN}$ have been introduced in above descriptions, the format of the $KSI_{ASME}$ is the same as that of the $KSI_{SGSN}$, only the $KSI_{ASME}$ is taken as an example for description in the above embodiments, the processing method of the $KSI_{SGSN}$ is the same as that of the $KSI_{ASME}$, therefore description relating to the $KSI_{SGSN}$ is not repeated in the present invention.

The present invention provides a system for generating an identifier of a key, which is suitable for generating an identifier of a key when a UE transfers from an EUTRAN to a UTRAN, the system comprises: a UE, a mobility management entity (MME) and a serving GPRS support node (SGSN), wherein:

the UE is used for mapping a $KSI_{ASME}$ of the EUTRAN into an identifier of a system key of the UTRAN;

the MME is used for mapping the $KSI_{ASME}$ into an identifier of a system key of the UTRAN and sending the identifier to the target SGSN;

the SGSN is used for receiving and storing the identifier of the system key and the ciphering key and the integrity key which are sent by the MME;

the mapping mode is as follows: the MME and the UE directly make the value of the identifier of the system key equal to that of the $KSI_{ASME}$, or equal to the sum of the value of the $KSI_{ASME}$ and a constant which is determined by the UE and a network side together.

Further, the UE comprises:

a first key set identifier mapping unit, for generating an identifier KSI of an IK and a CK, and mapping the value of the identifier $KSI_{ASME}$ of a key of a root key access security management entity of the EUTRAN, or the value of the identifier $KSI_{ASME}$ plus an appointed constant to the KSI;

a first key and identifier thereof storing unit, which is used for storing the system keys of the UTRAN, namely the IK and CK, and the identifier KSI of the system keys generated by the first key set identifier mapping unit;

a message receiving unit for receiving a key set identifier mapping success message sent from the network side; and a message sending unit for sending a request message to the network side.

Further, the MME unit comprises:

a second key set identifier mapping unit, for generating an identifier KSI of the IK and the CK, and mapping the value of the $KSI_{ASME}$, or the value of the $KSI_{ASME}$ plus an appointed constant to the KSI;

a security parameter sending unit, for sending the identifier KSI of the system keys generated by the second key set identifier mapping unit and the IK and the CK to the SGSN; and a request message receiving unit for receiving a key set identifier mapping request.

Further, the SGSN comprises:

a security parameter receiving unit, for receiving the IK and the CK and the identifier KSI thereof which are sent by the MME;

a third key and identifier thereof storing unit, which is used for storing the received identifier KSI, and the IK and the CK thereof;

a message sending unit, for informing the UE of a message indicative of the completion of the generation of an identifier of the network side.

By mapping the value of the $KSI_{ASME}$ in the EUTRAN into the value of the KSI in the UTRAN, the above method and system for generating a key set identifier, simultaneously guarantee that there are no repeated codes in the KSI and the previously-stored key sequence numbers, and solve the problem in existing techniques that the IK and the CK which are obtained through mapping cannot be reused for not being provided with an identifier when a UE transfers from the EUTRAN to the UTRAN.

The present invention also provides a system for generating an identifier of a key, which is suitable for generating an identifier of a key when a UE transfers from an EUTRAN to a GERAN, the system comprises a UE, a mobility management entity (MME) and a serving GPRS support node (SGSN), wherein:

the UE is used for generating an identifier CKSN of a ciphering key Kc of the GERAN by mapping a key set identifier for an access security management entity;

the MME is used for generating an identifier of a ciphering key and an integrity key by mapping a key set identifier of the access security management entity key, and sending the ciphering key, the integrity key and the identifier thereof to the SGSN; and the SGSN is used for receiving the ciphering key, the integrity key and identifier thereof which are sent by the MME, and assigning the value of the identifier to the identifier CKSN of the ciphering key Kc of the GERAN.

Further, the UE comprises:

a first key set identifier mapping unit, for generating an identifier CKSN of a Kc, and mapping the value of a key set of the access security management entity keyidentifier of the access security management entity key ($KSI_{ASME}$), or the value of the identifier $KSI_{ASME}$ plus an appointed constant to the CKSN;

a first key and identifier thereof storing unit, which is used for storing the key Kc generated by a first key generating unit and the identifier CKSN of the key generated by the first key set identifier mapping unit;

a message receiving unit for receiving a key set identifier mapping completion message sent from a network side; and a message sending unit for sending a request message to inform the network side of performing key set identifier mapping.

Further, the mobility management comprises:

a second key set identifier mapping unit, for generating an identifier KSI of the IK and the CK and mapping the value of the $KSI_{ASME}$, or the value of the $KSI_{ASME}$ plus an appointed constant to the KSI;

a security parameter sending unit for sending the SGSN the IK and the CK, and the identifier KSI of the IK and the CK which is generated by the second key set identifier mapping unit;

a request message receiving unit for receiving a key set identifier mapping request.

Further, the SGSN comprises:

a security parameter receiving unit, for receiving the keys of IK and CK, and the identifier KSI thereof which are sent by the MME;

a third key set identifier mapping unit, for assigning the value of the KSI to the CKSN;

a third key and identifier thereof storing unit, which is used for storing the key Kc and the identifier CKSN thereof; and a message sending unit for informing the UE of a message indicative of the completion of the generation of an identifier of the network side.

By mapping the value of the $KSI_{ASME}$ into the value of the CKSN, the method and system in the above embodiments for generating a key set identifier, simultaneously guarantee that there are no repeated codes in the CKSN and the key sequence number previously stored by the SGSN, and therefore solve the problem in existing techniques that the IK, the CK or the Kc which the $K_{ASME}$ is mapped into cannot be reused for not being provided with an identifier when the UE transfers from the EUTRAN to the UTRAN or GERAN. By using the method and system, the IK, the CK or the Kc can be reused after the transfer, the interaction signaling is reduced between the UE and the network side, and the satisfaction level of the user on the use of the network is improved.

Apparently, it should be understood by those skilled in the art that all the modules or steps of the present invention can be realized by universal computing devices, and can be centralized on a single computing device or distributed on a network consisting of multiple computing devices, and optionally can be realized by program codes executable to computing devices, therefore all the modules or steps can be stored in a storage device to be executed by computing devices, or it can be realized by making all the modules or steps into integrated circuit modules respectively, or making multiple modules or steps of them into a single integrated circuit module, thus the present invention is not limited to the combination of any specific hardware and software.

The above mentioned is only preferred embodiments of the present invention but not to limit the present invention, various modifications and changes can be devised by those skilled in the art, and it should be understood that any modification, equivalent substitution and improvement devised without departing from the spirit and scope of the present invention, shall be within the protection scope of the present invention.

INDUSTRIAL APPLICABILITY

By mapping the value of a $KSI_{ASME}$ into the value of a CKSN, the above method and system for generating an identifier of a key, simultaneously guarantee that there are no repeated codes in the CKSN and the key sequence number previously stored by an SGSN, and therefore solve the problem in existing techniques that, the IK, the CK or the Kc which a $K_{ASME}$ is mapped into cannot be reused for not being provided with an identifier when a UE transfers from an EUTRAN to a UTRAN or GERAN; thereby the method and system of the present invention make the IK, the CK or the Kc can be reused after the transfer, reducing the interaction signaling between the UE and a network side, improving the satisfaction level of the user on the use of the network, and therefore has high industrial applicability.

What is claimed is:

1. A method for generating an identifier of a key, comprising:
when a user equipment (UE) transfers from an evolved UMTS terrestrial radio access network (EUTRAN) to a universal terrestrial radio access network (UTRAN), a mobility management entity (MME) and the UE generating a key set identifier of a UTRAN system by mapping a key set identifier of an access security management entity key; and the MME sending a serving GPRS support node (SGSN) the key set identifier of the UTRAN system, along with a ciphering key and an integrity key of the system;
wherein, the generation method of the mapping comprises: the UE and the MME directly assign the value of the key set identifier of the UTRAN system to be the sum of the value of the key set identifier of the access security management entity key and a constant which is appointed by the UE and network side;
wherein when the UE transfers from the EUTRAN to the UTRAN in an idle state, after receiving a user information extraction request message sent by the UE to the SGSN, the MME generates an integrity key and a ciphering key using the key of the access security management entity, generates an identifier of the integrity key and the ciphering key, that is, a key set identifier, by mapping the key set identifier for the access security management entity, and sends the integrity key, the ciphering key and the key set identifier to the SGSN via a user information extraction response message; and the SGSN stores the ciphering key, the integrity key and the key set identifier.

2. The method according to claim 1, wherein the request message sent by the UE to the SGSN for transferring to the UTRAN in an idle state is a routing area update request message;
correspondingly, the user information extraction request message is a context request message; and
the user information extraction response message is a context response.

3. The method according to claim 1, wherein the request message sent by the UE to the SGSN for transferring to the UTRAN in an idle state is an attachment request message;
correspondingly, the user information extraction request message is an identification request message; and
the user information extraction response message is an identification response.

4. The method according to claim 1, wherein after determining to transfer to the UTRAN in an idle state and before correspondingly sending the SGSN a message indicative of the completion of the transfer to the UTRAN in an idle state, the UE generates a key set identifier by mapping the key set identifier of the access security management entity key, and stores the key set identifier, along with the integrity key and the ciphering key which are generated from the key of the access security management entity.

5. The method according to claim 4, wherein the message sent by the UE to the SGSN for indicating the completion of the transfer to the UTRAN in an idle state is a routing area update completion message or an attachment completion message.

6. The method according to claim 1, wherein when the UE transfers from the EUTRAN to the UTRAN under the condition that a radio resource control (RRC) is in an active state, after receiving a handover request, the MME generates an integrity key and a ciphering key using the key of the access security management entity, generates an identifier of the integrity key and the ciphering key, that is, a key set identifier, by mapping the key set identifier of the access security management entity key, and sends the integrity key, the ciphering key and the key set identifier to the SGSN via a forward redirecting request message; the SGSN stores the ciphering key, the integrity key and the key set identifier; and after receiving a handover command sent by the network side, the UE generates a key set identifier by mapping the key set identifier of the access security management entity key and stores the key set identifier, along with the integrity key and the ciphering key which are generated from the key of the access security management entity.

7. The method according to claim 1, wherein if a key is associated by the network side and the UE before the UE transfers, and if the key set identifier associated before the transfer is the same as that of the system key which is generated by mapping the key set identifier of the access security management entity key during the transferring process, then the keys stored in the SGSN and the UE before the transfer are deleted.

8. A system for generating an identifier of a key, which is suitable for generating an identifier of a system key when a UE transfers from an EUTRAN to a UTRAN, comprising: a user equipment (UE) UE, a mobility management entity (MME) and a serving GPRS support node (SGSN), wherein:
the UE is configured to map a key set identifier for an access security management entity into a key set identifier of a UTRAN system; and
the MME is configured to map a key set identifier for the access security management entity into a key set identifier of the UTRAN system and send the obtained identifier to the SGSN;
wherein, a mode of the mapping is as follows: the UE and the MME directly assign the value of the key set identifier of the UTRAN system to be the sum of the value of the key set identifier of the access security management entity key and a constant which is appointed by the UE and a network side;
wherein, when the UE transfers from the EUTRAN to the UTRAN in an idle state, the MME is further configured to:
receive a user information extraction request message sent by the UE to the SGSN:
generate an integrity key and a ciphering key using the key of the access security management entity, and generate an identifier of the integrity key and the ciphering key, that is, a key set identifier, by mapping the key set identifier for the access security management entity; and
send the integrity key, the ciphering key and the key set identifier to the SGSN via a user information extraction response message; and
the SGSN is further configured to receive and store the ciphering key, the integrity key and the key set identifier.

* * * * *